(12) United States Patent
St. Clair

(10) Patent No.: US 6,408,333 B1
(45) Date of Patent: Jun. 18, 2002

(54) SYSTEM FOR PORTABLE ESTABLISHING NETWORK SERVER

(75) Inventor: William G. St. Clair, Crownsville, MD (US)

(73) Assignee: Horizon Technologies Inc., Marietta, PA (US)

( * ) Notice: Subject to any disclaimer, the term of this patent is extended or adjusted under 35 U.S.C. 154(b) by 20 days.

(21) Appl. No.: 09/632,083

(22) Filed: Aug. 2, 2000

Related U.S. Application Data

(63) Continuation of application No. 08/348,080, filed on Nov. 23, 1994, now abandoned.

(51) Int. Cl.[7] ...................... G06F 15/177; G06F 15/173
(52) U.S. Cl. .................. 709/222; 709/223; 710/102
(58) Field of Search ................... 712/36; 710/8, 710/104, 102, 101, 106; 707/103; 709/203, 221, 222, 223

(56) References Cited

U.S. PATENT DOCUMENTS

| | | | | |
|---|---|---|---|---|
| 5,313,630 A | * | 5/1994 | Namioka et al. | 707/103 |
| 5,471,634 A | * | 11/1995 | Giorgio et al. | 707/104 |
| 5,491,827 A | * | 2/1996 | Holtey | 711/163 |
| 5,522,077 A | * | 5/1996 | Cuthbert et al. | 709/303 |
| 5,537,558 A | * | 7/1996 | Fletcher et al. | 710/129 |
| 5,546,584 A | * | 8/1996 | Lundin et al. | 709/303 |
| 5,566,346 A | * | 10/1996 | Andert et al. | 710/8 |

* cited by examiner

Primary Examiner—Larry D. Donaghue
(74) Attorney, Agent, or Firm—Rosenberg, Klein & Lee

(57) ABSTRACT

A network system (10) is provided which utilizes a portable object server (12) for interface and computational capabilities with a global processor (14), and a plurality of local processors (16, 18 and 20). The portable object server (12) may include additional object storage components (22) in the form of Flash or static RAMs which may be used to increase the storage capability of the portable object server (12). The portable object server (12) may be in the form of a card member or other medium which is portable and may be used from one network system (10) to another. Additionally, portable object server (12) may be inserted or applied to a selected one of the processing units (14, 16, 18 or 20) and may be used as a portable server at the discretion of the user. In overall concept, portable object server (12) allows the user to set up any local processor or host computer (14, 16, 18, or 20) as a server for network system (10).

18 Claims, 9 Drawing Sheets

SYSTEM FOR PORTABLE ESTABLISHING NETWORK SERVER

This appln is a cont of Ser. No. 08/348,080 filed Nov. 23, 1994, abn.

BACKGROUND OF THE INVENTION

1. Field of the Invention

The subject portable network server system is broadly directed to computer network systems. In particular, the portable network server system provides for a portable object server which interfaces on a standard bus line with a host computer and a plurality of local processors. Still further, the subject portable network server system is directed to a portable server which may be electrically coupled to a global processor or at least one local peer processor for reversible transmission of object data therebetween. Still further, the portable network server system includes an object server processor mounted thereon for processing object data with the object server processor in communication with a local processor. More in particular, the subject invention system relates to a portable object server which includes object interface circuitry coupled to an object server processor and a local processor interface for providing data conversion signals to the local processor interface for reversible transmission of processing signals to the global processor. Still further, the portable network server system includes a portable object server which includes a plurality of first and second I.C. buffers coupled to the object server's processor and a local processor interface for selective passage therethrough of signals responsive to processing of a predetermined program within the object server processor. More in particular, the portable object server of the portable network server system includes management circuitry in signal communication with the object interface and an object knowledge base for reversibly retrieving object data from the object knowledge base and passing the object data to a local processor for processing a predetermined application program within the local processor. Still further, the portable object server may be incorporated in a card format for insert into local processors and/or a host or global processor.

2. Prior Art

Computer network systems are well-known in the art. However, computer servers are generally stationary and are not mobile for incorporation into one or more processors of a networking system. Such prior art server systems are generally static in nature and are not mobile at the discretion of the user.

SUMMARY OF THE INVENTION

There is provided a portable network server system having a global processor or network of peer processors defining intelligent object management programs for transacting object-oriented operations and for converting data base persistent storage structures to disk file formats, ASCII messages, and other application-specific formats. The portable network server system includes a portable object server which is operably and removably coupled to at least one network, system processor for management and reversible transfer of knowledge base object data between two or more of such processors. The portable network server system facilitates a complete plug and play network incorporating the seven layers of the OSI network model. The portable object server supports network interconnection between a node processor and the global processor of a given network, as well as peer-to-peer network interconnection between node processors without the intervention of the network's global processor. The object server includes an object server processor for operationally driving the portable object server insertable or resident within a network processor.

DESCRIPTION OF THE PREFERRED EMBODIMENTS

Figure 1:
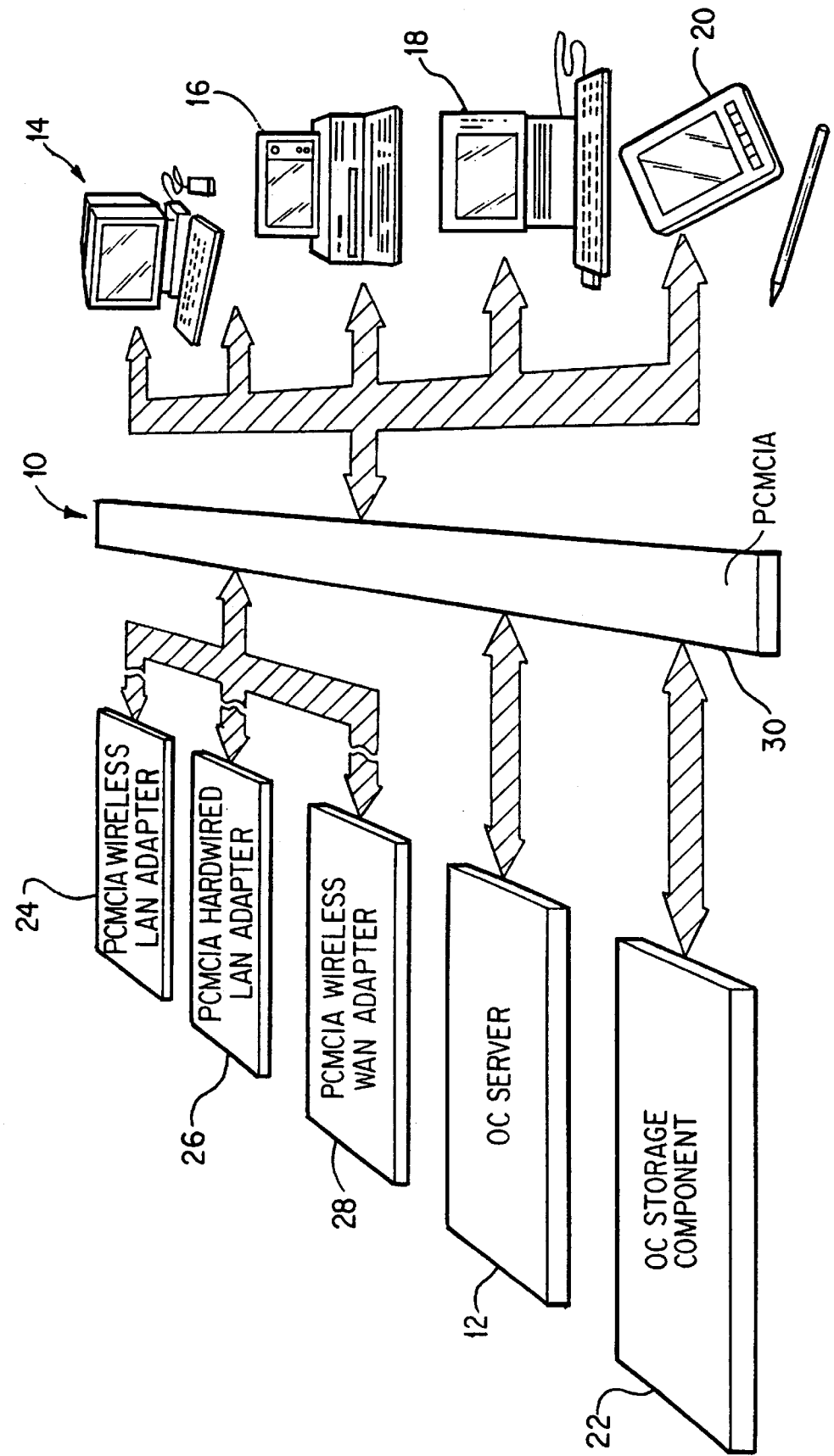
FIG. 1 is a conceptual diagram showing the portable network server system in operational concept.

Referring now to FIG. 1, there is shown the physical configuration of network system 10 adapted to be operationally interfaced with portable object server 12 for providing operation of network system 10 when applied to work station 14. Work station 14 may be: a host computer or global server; a network computer 16 or 18 such as an IBM PC or an Apple MacIntosh functioning as a host computer or global server; or a mobile unit as represented by element 20. In the manner to be described in following paragraphs, portable object server 12 may be inserted within network system 10 into processors 16, 18, 14, or 20, to be operationally capable of providing a portable server which supports the entire network system 10 utilizing wired and/or wireless network communications.

In this manner, there is provided an overall portable network server system which allows a user to essentially carry a server with him or her. The user may invoke network system 10 operation simply by inserting portable object server 12 into a local processor of that network 10.

The overall physical network system 10 further includes persistent storage component 22, wireless local area network (LAN) adapter 24, hard-wired local network (LAN) adapter 26, as well as possibly a wireless wide area network (WAN) adapter 28 for interface with standard Portable Computer Memory Card International Association (PCMCIA) interface 30 which is of a 16-bit I/O or 32-bit CardBus standard well-known in the art. Alternatively, access to public phone lines may be provided in place of adapters 24, 26, and 28. In this manner, network system 10 is operationally served by portable object server 12 carried by the user to be incorporated in and applied to local processors 16, 18, wireless mobile unit 20, or host computer 14 of a given network system 10 or another network system.

Network system 10 may further include an additional object storage component 22 which is essentially supplemental non-volatile storage hardware (Flash or static RAM devices, or PCMCIA form factor microdrives) which provides the user with extended memory storage capabilities. In one form, portable object server 12 may include standard PCMCIA cards, commonly referred to as type II or III cards, insertable into computing units 14, 16, 18, or 20 to accommodate a wide variety of individual local processors for operation as servers on network'system 10. The portable object server 12 may also function as an autonomous server, without local processor intervention, especially when the PCMCIA CardBus standard is applied. As will be noted in following paragraphs, portable object server 12 may not in itself contain communication devices, relying on either a communication capability internal to processors 14–20, or communication capability included external thereto in the overall network system 10.

Computing units 14–20 may be referred to as object card nodes (OCN), and a particular OCN node may have at least one portable object server 12 coupled within the terminal. Where no communication devices are provided internal to a given processor unit, a PCMCIA adapter card 24, 26, or 28 is required to interface object server 12 with PCMCIA interface 30 for necessary signal communications therebetween. Adapter cards 24, 26, or 28 may, in any case, be included with a portable object server on the same. PCMCIA platform such that their respective functionalities are combined in one unit for enhanced autonomy of operations.

Object-oriented systems are known in the art. The object-oriented concept as the architectural paradigm is rapidly gaining acceptance in networking applications. The concept lends itself to the establishment of universal interoperability and interaccessibility of application programs and data base elements to users of a comprehensive computer network system 10. Network system 10, as herein described, facilitates the realization of the aforementioned goals when applied to a PCMCIA-based computer network.

In further explanation and description of network system 10, as will be described in following paragraphs, each entity of an application in an object-oriented system is modeled as an object, with each having a unique identifier. Additionally, each object contains a state and a behavior where the state of the object consists of a set of values for the object's attributes, generally referred to as instance variables or fields. The attributes collectively define the range of operands which may be operated upon, and the behavior of an object consists of a set of methods, or procedures, which operate on the attributes.

With regard to data structure, object structure is similar to the well-known record structure in that such comprises a number of fixed fields. Unlike record structures, however, the fields of an object structure may be added to during computation. Obviously, this has far-reaching implications in shared data or knowledge based applications where a concurrency of information may be important.

In order to facilitate optimal retrieval times and errorless referencing, objects are organized in conceptually-related hierarchial structures where a class or type is grouped together for objects sharing a common set of attributes and methods. Any number of sub-classes may be assigned within a class with each sub-class inheriting the attributes and methods of the higher class and possibly specifying additional attributes and methods. Each of the objects is a member of one class, and the structural complexities that a nested framework can eventually lead to are avoided by schemes of an object-oriented data base. The schemes of a data base not only contain the attributes and methods in each class, but also map the relative position of each class within the embodied hierarchial framework to allow efficient use of a particular object access with reference to a particular scheme.

Overall computer network system 10 employs a basic protocol in communications between portable object server 12 and processor units 14, 16, 18, and 20. The overall concept is to effect a generic type of communications system wherein the incorporation of portable object server 12 adapts that system for operation within a WAN or a LAN at the discretion of the user.

Figure 2:
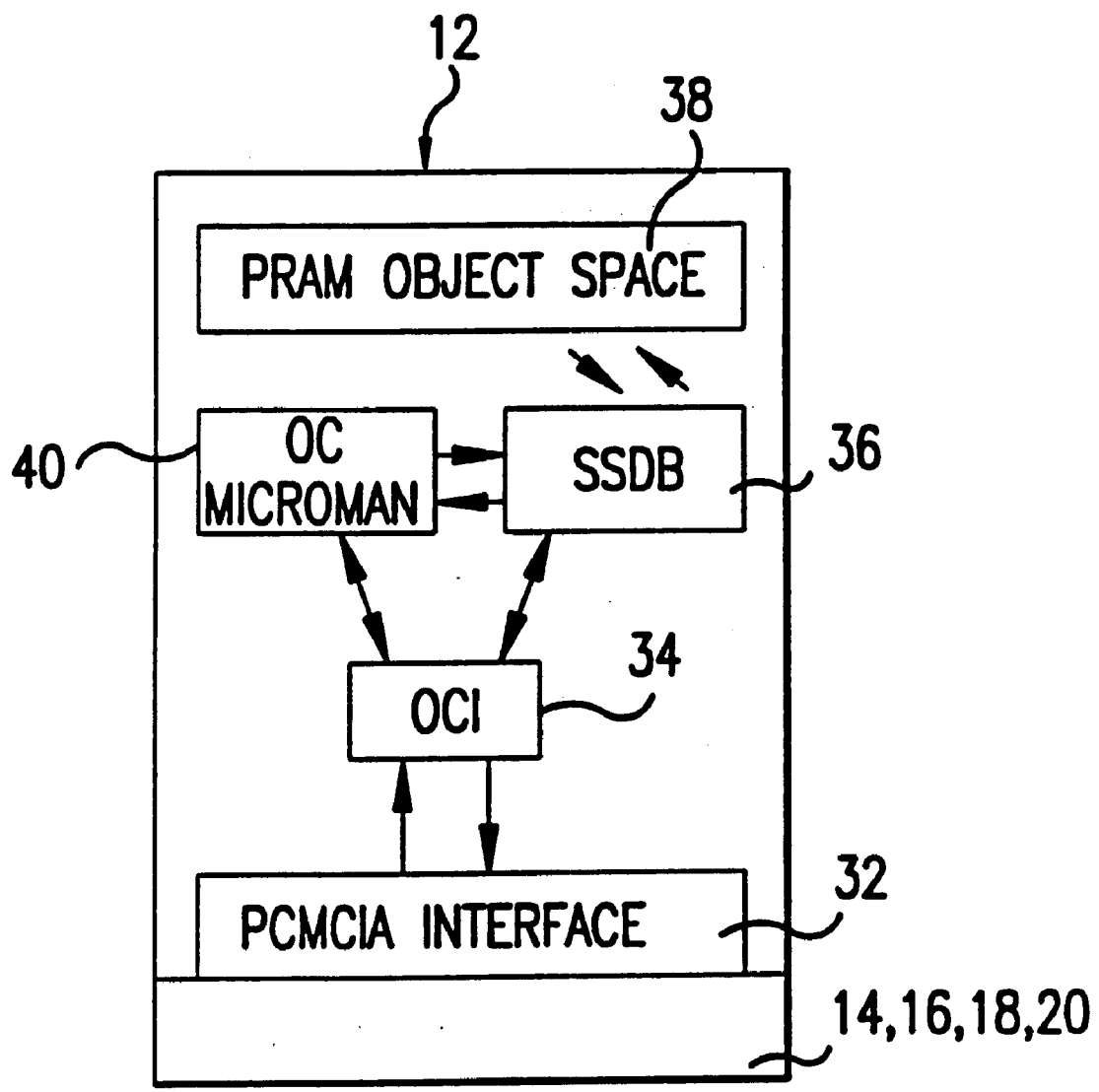
FIG. 2 is a schematic diagrarm of the topology of the portable object server utilized in the portable network server system.

Referring now to FIG. 2, there is shown the overall system topology for portable object server 12. Each portable object server 12 has a standard PCMCIA interface 32 for interfacing with local processors 14–20, as is shown in the block diagram of FIG. 2. Object card interface (OCI) 34 resides on portable object server 12 and has the function of managing the operation of PCMCIA interface 32.

Object card interface (OCI) 34 may accommodate multiple object I/O types, including data, voice and graphics. OCI 34 further services object card micromanager (OCMM) 40 which operates on the given local processor 14, 16, 18, or 20 and resides on portable object server 12.

Object micromanager system (OCMM) 40 which is coupled to both object card interface (OCI) 34 and the solid state data base (SSDB) 36 is analogous in application and similar in configuration to well-known object-oriented data bases. Solid state data base (SSDB) 36 manages storage in a particular object space 38. The object space 38 physically consists of a plurality of Flash or static non-volatile RAM memory devices described in later paragraphs.

PCMCIA interface 32 has standard functions that include the identification of other devices accessible to PCMCIA interface 32 and network system 10. PCMCIA interface 32 automatically enables adaptation to those other devices such that the overall system 10 accommodates a plug/play capability across PCMCIA interface 32. Object card interface (OCI) 34 protocol handles transfers across PCMCIA interface 32 to a particular node 14, 16, 18, and/or 20 of network system 10.

As previously referred to, object card interface (OCI) 34 interfaces with and is electrically coupled in responsive relation to PCMCIA interface 32, as well as with OCMM 40 and SSDB 36. SSDB 36 is responsively coupled to object space 38 (part and parcel of SSDB 36). All of these systems are resident on the object server 12, as will be further described for FIG. 4 in the following paragraphs.

SSDB 36 provides the object storage management capability on portable object server 12 which entails managing local storage of objects as well as managing the remote storage and update of objects that exist in other nodes 14–20 of computer network system 10. SSDB 36 stores objects that are created or utilized by various applications which reside in the given nodes 14–20. Where SSDB 36 of a given portable object server 12 remotely provides network storage, the stored objects must be registered with the object card request broker (ORB) preferably residing in OCI 34. This registration with the ORB must occur whenever an object is to be managed across the overall network system 10.

Incorporated within the ORB are various methods that facilitate global management of an object across network system 10. For generic, non-ORB compliant, applications, objects are only stored locally; although they are incorporated into network system 10. Such objects are referred to as local objects.

Prior to discussing the architecture of portable server 12, it should be noted that, as shown in FIG. 1, SSDB 36 may also be in signal communication with object storage components 22 which provide additional persistent storage. Persistent storage components 22 may be supplemental Flash or static ram or a PCMCIA microdrive whereby the network system 10 object storage capacity is increased for the user.

The software architecture of portable object server 12 generally comprises three basic elements: SSDB 36, OCMM 40, and OCI 34. OCI 34 performs its operations utilizing physical buffers (to be described) residing on portable object server 12. OCI 34 performs operations utilizing PCMCIA interface 32 protocol operations in the overall portable object management system (POMS) which include, for example, the formatting necessary to be compliant with TCP/IP protocol.

Object card micromanager (OCMM) 40, shown in FIG. 2, includes a main program and various executable programs that reside on portable object server 12. OCMM 40 includes logic that asserts control to support the performance and processing of various operations necessary for a particular application. OCMM 40 resides in firmware and performs operations that constitute the overall server environment necessary to support a local environment, including microprocessor memory management. OCMM 40 also functions as the engine for a dumb terminal providing for that terminal a computing environment and specific application capabilities for operation within that environment.

Referring to the object card knowledge base embodied in SSDB 36, such may be considered a small-scale object-oriented data base system. SSDB 36 handles objects which are either of a portable or local object type. Portable objects are those registered with the ORB and shared with SSDB 36 systems in other nodes 14–20 across networking system 10. Local objects are objects that are stored and maintained in a local manner within one of the local processors and may not be transferred, nor managed, across the network system 10. Thus, SSDB 36 is a system that generally manages and stores all system objects. SSDB 36 stores those objects in an optimized format which may be serialized and which may reside in portable server 12 or in storage component 22.

Figure 3A:
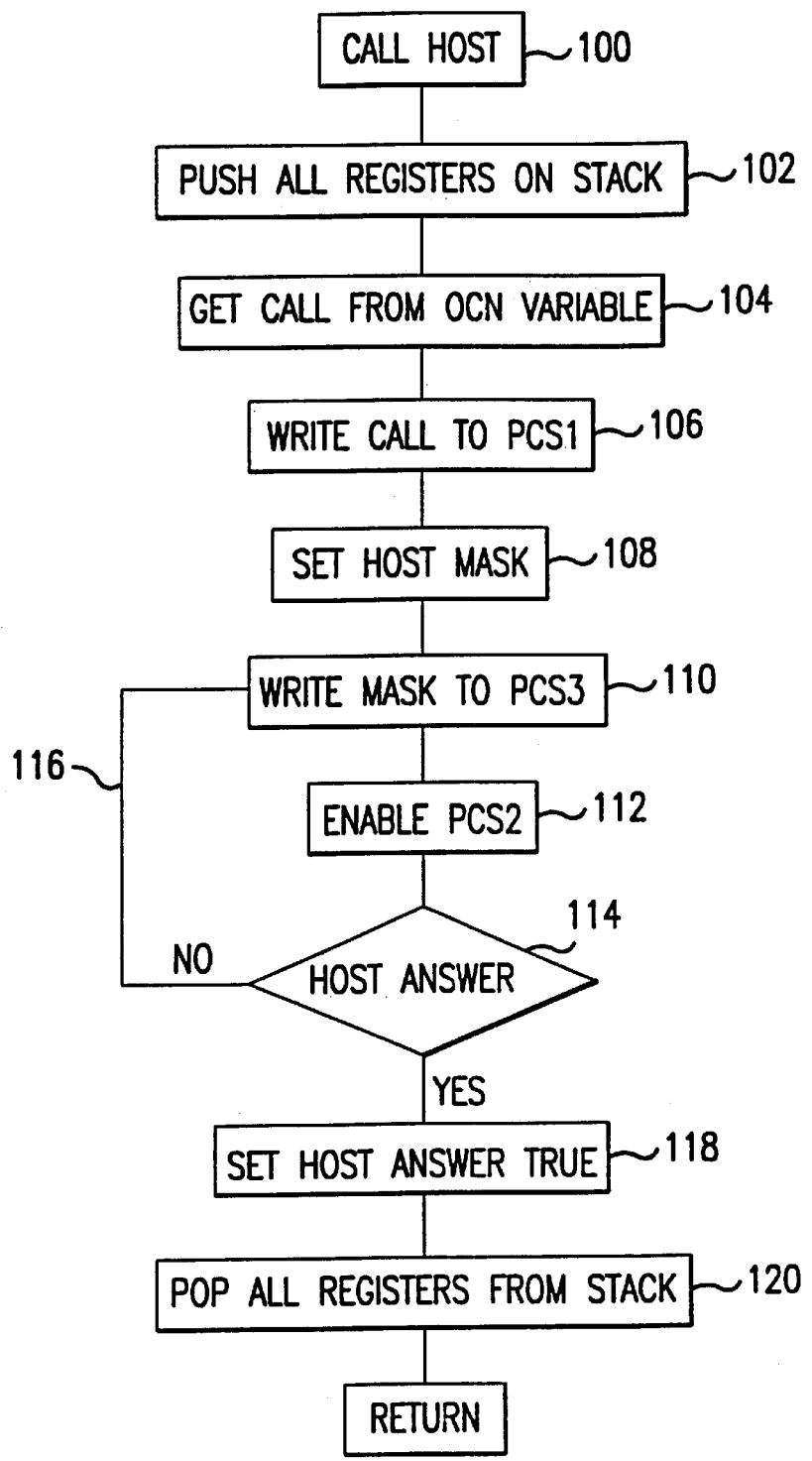
FIGS. 3A–3F are system flow block diagrams of the portable object server functions; and, FIG. 4 is a schematic diagram of the breadboard of a portable object server.
Figure 3B:
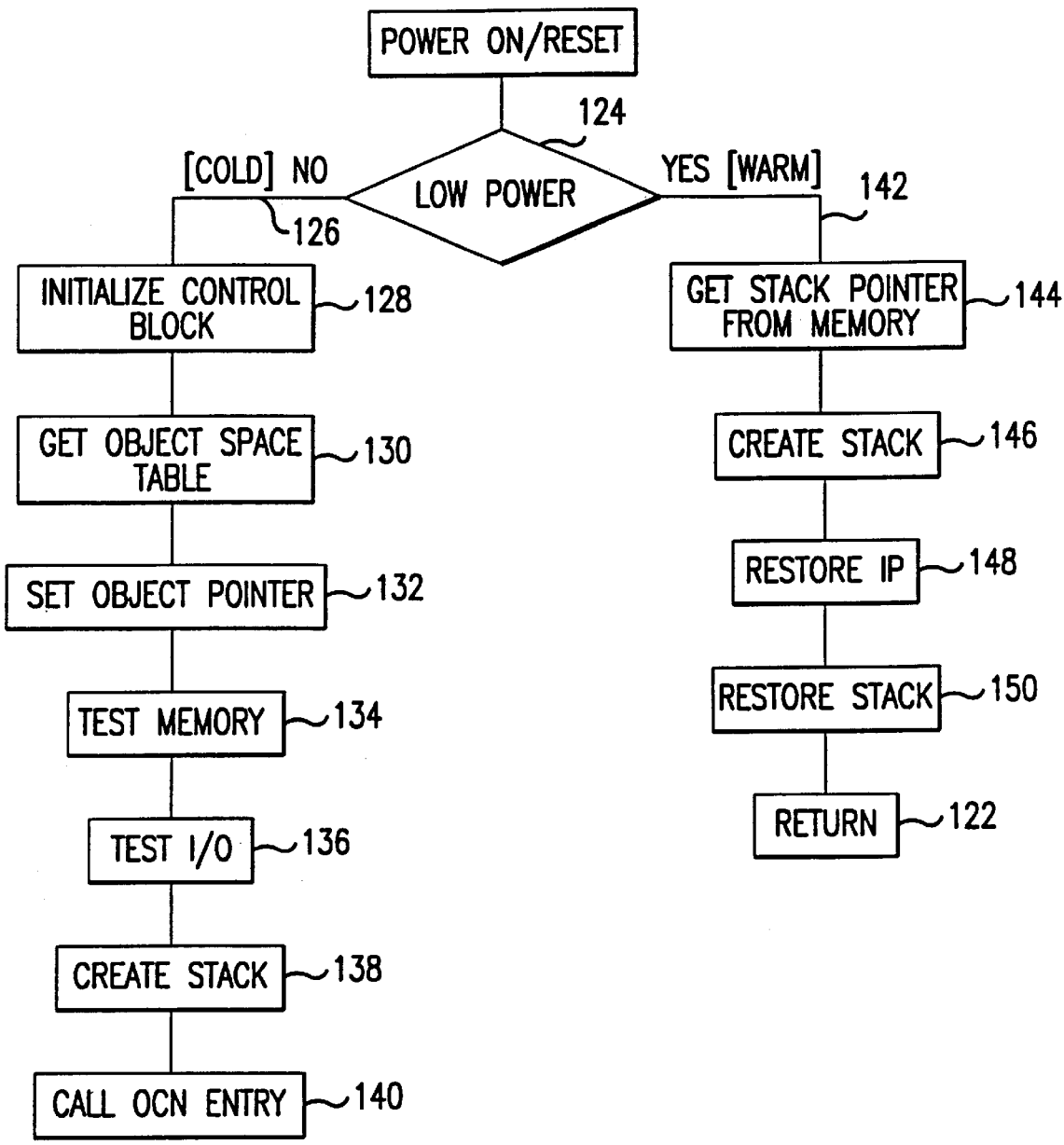
Figure 3C:
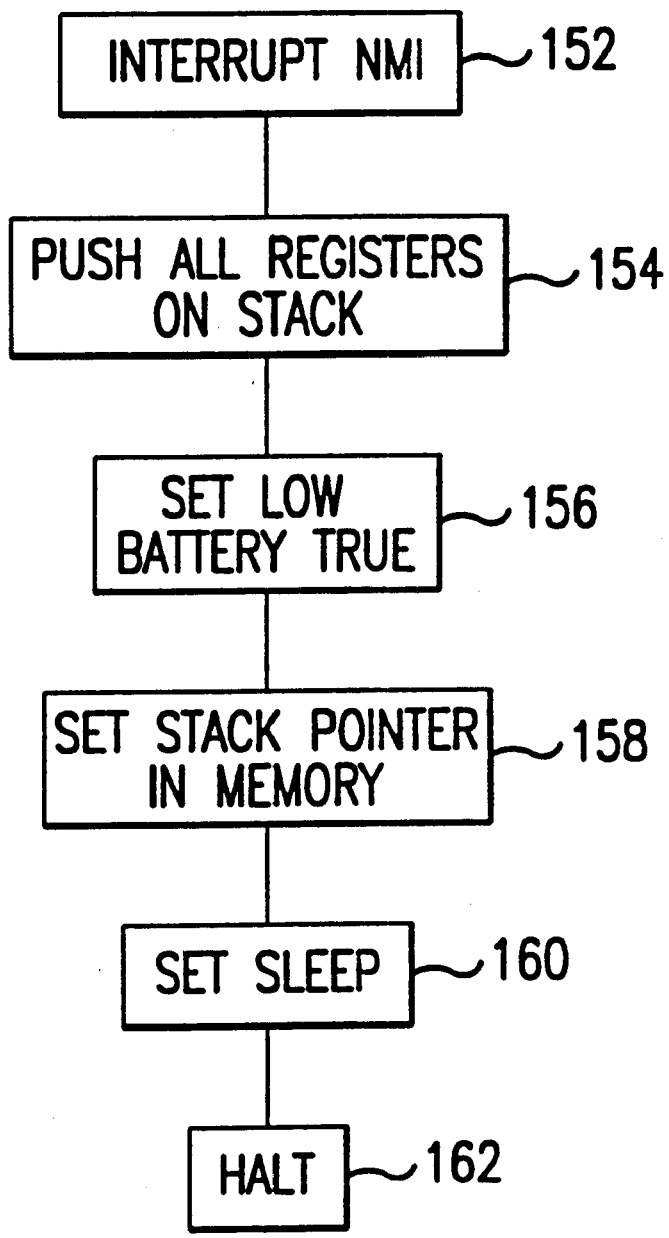
Figure 3D:
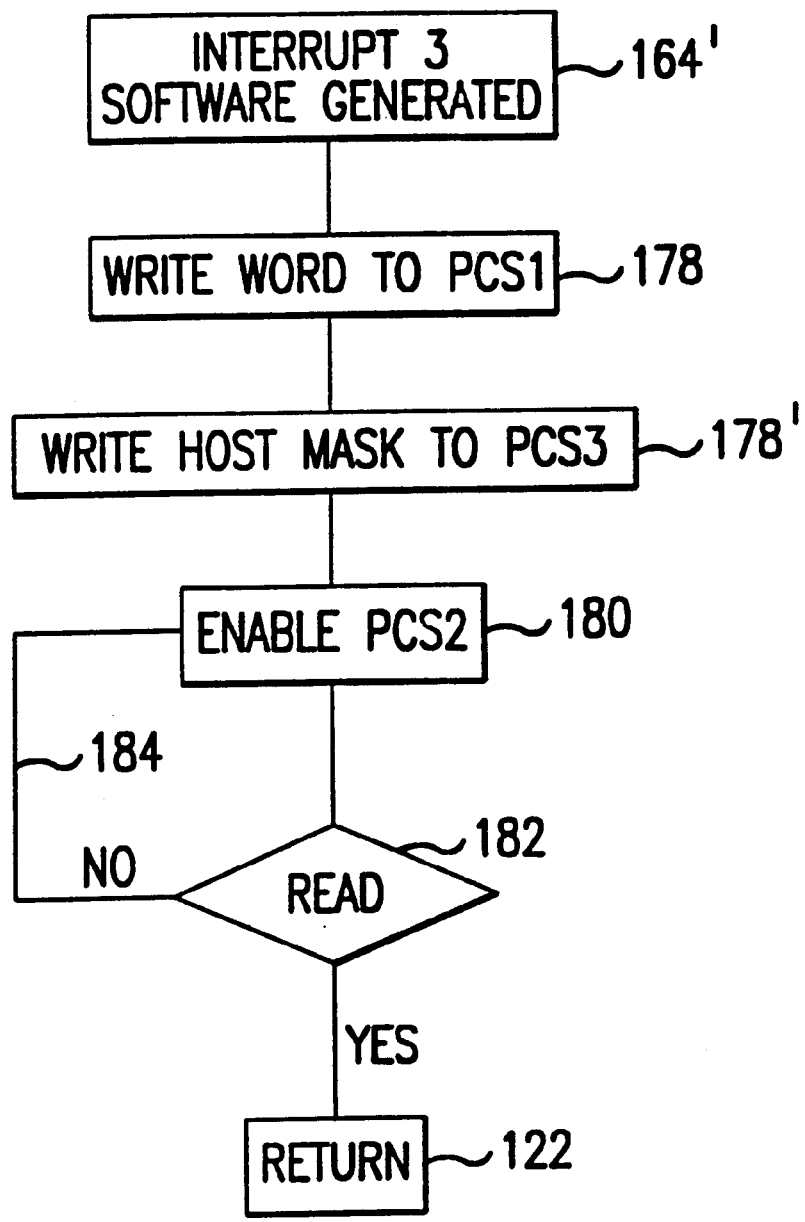
Figure 3E:
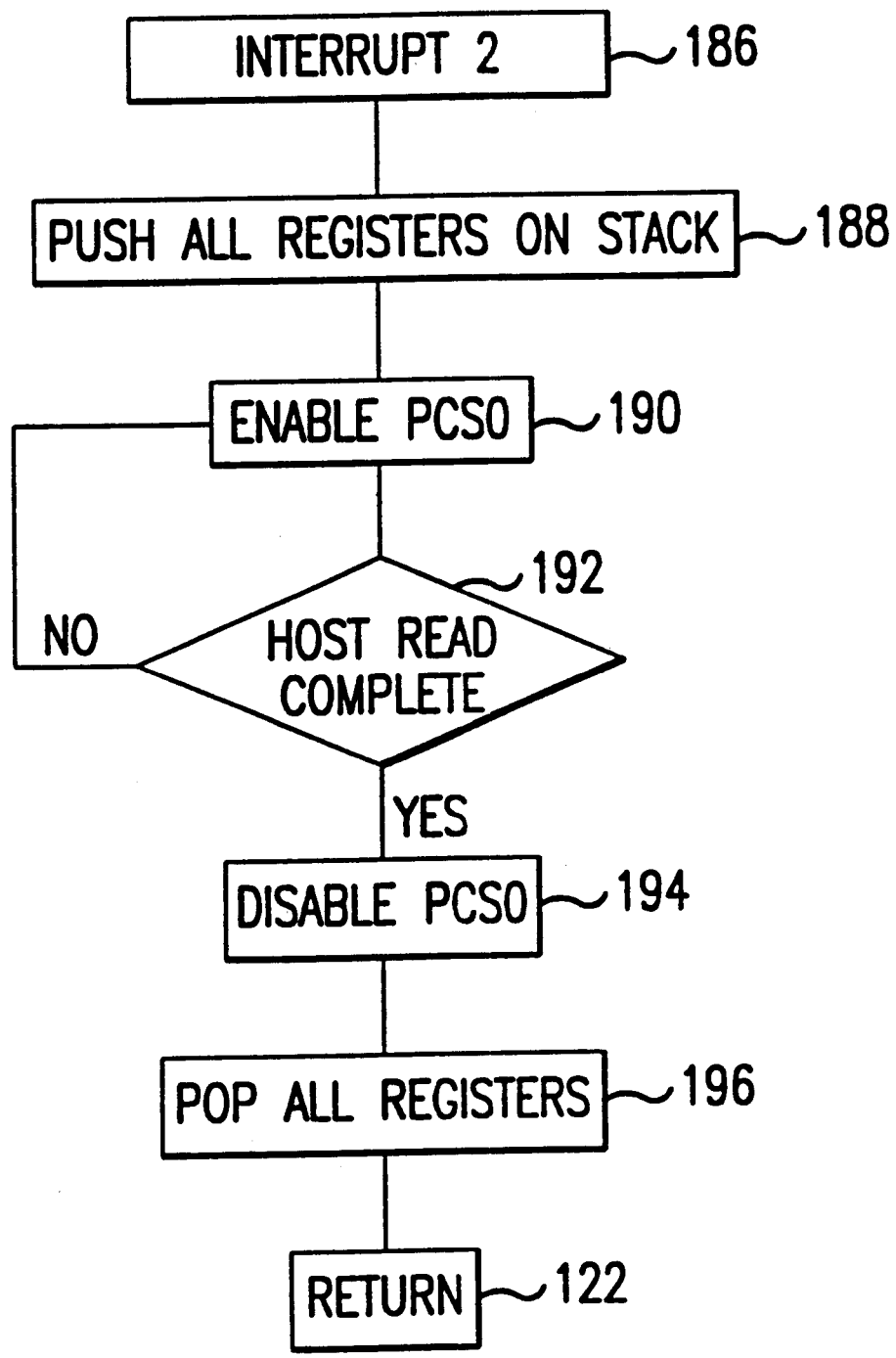
Figure 3F:
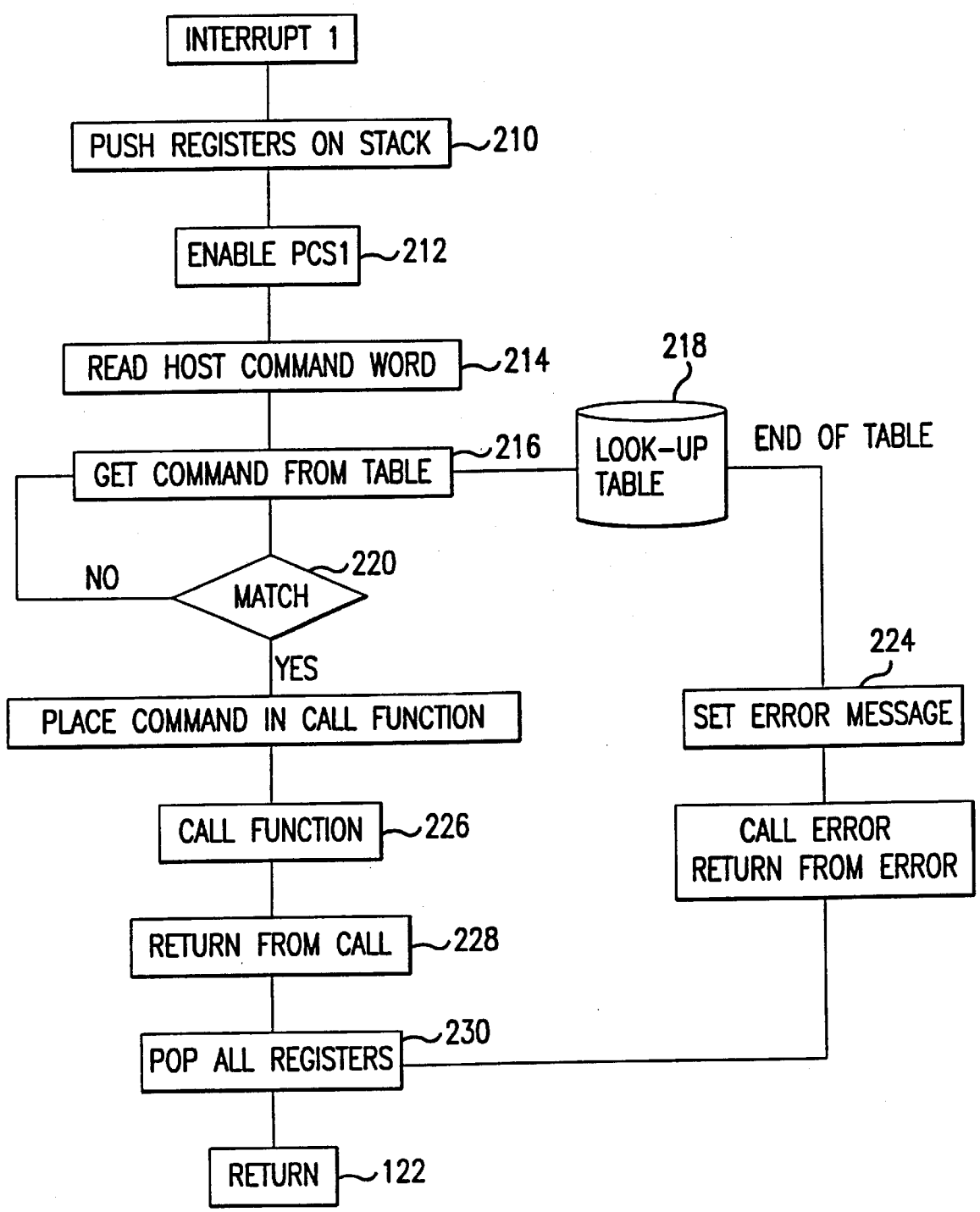
Figure 4:
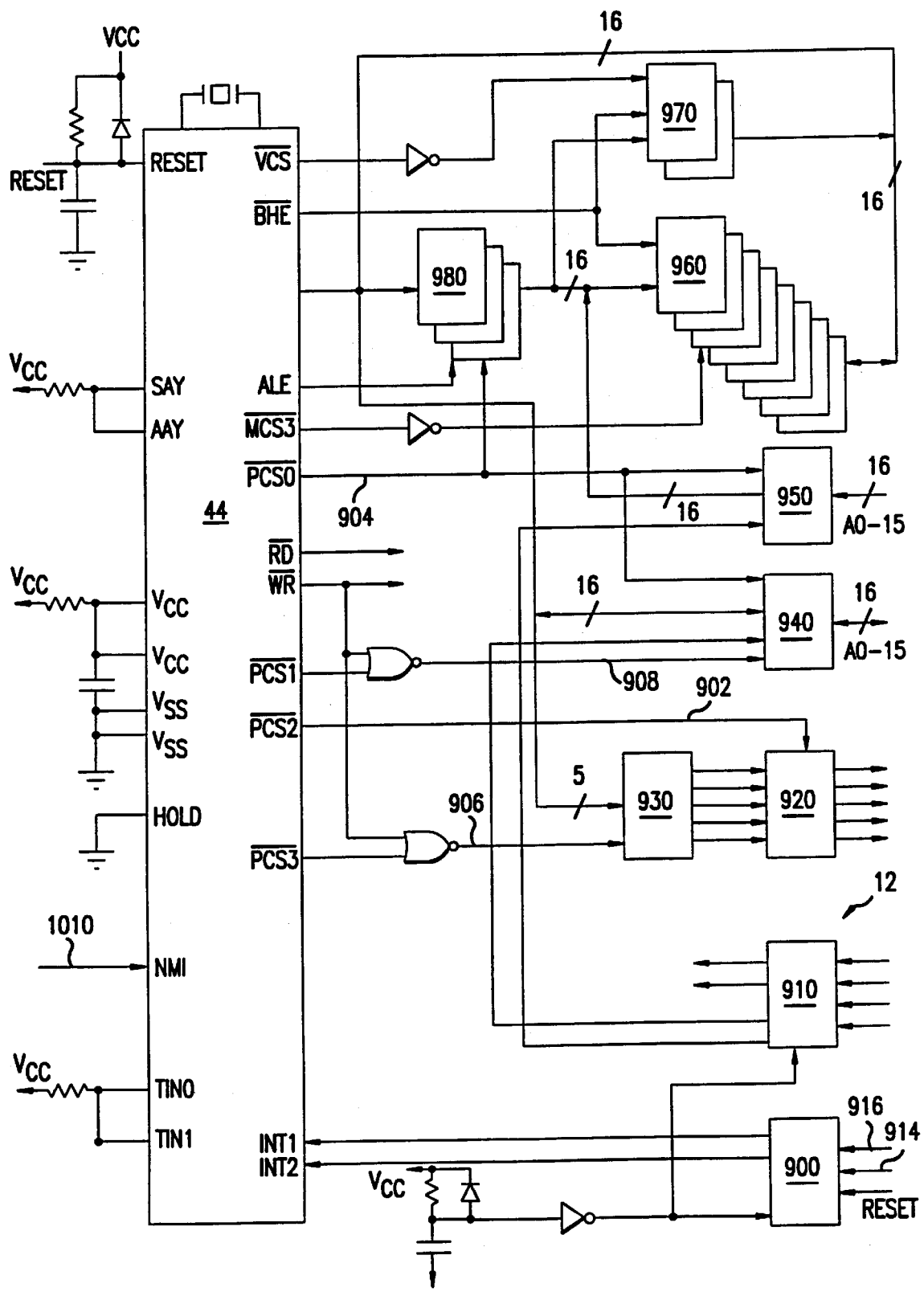

Referring now to FIGS. 3A–3F, to be used and described in conjunction with the firmware schematic FIG. 4 representing the firmware within portable object server 12 and essentially describing the server breadboard. As seen in FIG. 4, portable object server 12 includes object server processor 44 which functions as the processing engine for server 12. Object server processor 44 may be of an INTEL 80L186EA engine type having 1 Mbyte of static ram memory, or alternatively, of an INTEL 80HC380SX type having 1–5 Mbytes of Flash or static ram memory. Although not significant to the overall concept, object storage components 22 shown in FIG. 1 may include 2 Mbytes of Flash or static ram memory, or PCMCIA form factor microdrive, the capacity being increased to 5, 10, 20 and 40 Mbytes at the discretion of the user and depending on the particular application in network system 10. Note that where a microdrive is employed as storage component 22, the capacity may be increased to 240 Mbytes.

The embedded micromanager, as outlined in the description of FIGS. 3A–3G and FIG. 4, provides operations for input/output, sending/receiving messages, initiation upon power up, restarting with low battery power, as well as restarting after a fault or crash of the overall system 10.

Referring now to FIG. 3A, where a particular application issues a Call Host software interrupt 100, all operating registers are initially pushed onto the stack as shown in flow block 102. Responsive to the registers being pushed onto the stack, the Call from the application is read from the particular node 14–20 variable in flow block 104 conveying that Call. The Call shown in block 104 signifies to the particular object card node. (OCN) 40 that the portable object server 12 must interface with the host processor of that OCN.

As provided in block 104, the message is passed from the portable object server 12 to the local host processor. Once the Get Call statement is initiated in flow block 104, the calling function is written to peripheral chip select group 1 (PCS1) in block 106. Thus, the Get Call command extracted from the OCN variable in flow block 104 is read by processor 44 from 16-bit input/output bus 940 shown in FIG. 4. When the Write Call to PCS1 in flow block 106 of FIG. 3A is invoked, a 16-bit command word is written from 16-bit output bus 940 to the host-server interface bus. Once the Write Call to PCS1 has been completed, the Set Host Mask of flow block 108 is entered in order that the Write Mask may be written to peripheral chip select group 3 (PCS3) (FIG. 4) passing through IC buffers 930 and 920 to the interface bus. The Write Mask to PCS3 is seen in flow block 110 of FIG. 3A with the associated firmware shown in FIG. 4.

Subsequent to this action, PCS2 is enabled in block 112 and PCS2 signals the microcontrol processor unit (MCU) which may be an 80186EA chip, that the interrupt is requested on line 902. The overall system is then placed in an idle mode in block 114 and waits for the host MCU to answer. Host answer block 114 is coupled to the Write Mask to PCS3 block 110 through line 116, as is shown. If a reading of block 910 of FIG. 4 indicates that the host has not answered, the mask is then written again as is seen by the decision block 114 respectively signalling flow block 110. Thus, Write Mask to PCS3 block 110 is recursively actuated so that the interrupt is issued responsively. When the host answers positively in flow block 114, execution then progresses to block 118 where the answer is set to True, indicating that the host has received the 16-bit instruction word or command and that the application has been informed of such. This essentially completes the sending of the command from the server to the host and execution progresses to block 120 where all registers are removed from the stack and control of system execution is returned through block 122.

Referring now to FIG. 3B, there is shown the flow block diagram directed to the Power On/Reset routine which is actuated when portable object server 12 is inserted into a local processor or global processor 14–20. Alternatively, the Power On/Reset routine is actuated if the server 12 has already been inserted into a local processor, when the local processor is powered to an "on" condition or when the local processor issues a hardware reset/software reset command. In the power on/reset routine of FIG. 3B, the signal initially passes to Low Power decision block 124 where a decision is made as to whether or not a "cold" start (power-on) is being provided or whether a "warm" start (reset) is being initiated. Assuming that a "cold" start sequence is initiated, the signal passes through line 126 to initialization block 128 where the control function of the computer is initialized. The signal is then driven to block 130 where the object space table cataloging the objects that have been compressed and stored on portable server 12 is retrieved and maintained in static rams 960, with the software program being held in EEPROM block 970 which is downloadable firmware 970. The object pointer is then set in flow block 132 to the first compressed object available for retrieval and expansion. Execution continues to block 134 where server memory is tested. Signals are then passed to flow block 136 where the input/output function performed by blocks 950, 920, 910, and 900 of FIG. 4 is tested and initialized. The signal leaving block 136 is inserted to flow block 138 wherein a new stack is created within which the computer system is to operate. Finally, passage to block 140 calls the application entry point to complete the "cold" start procedure for portable server 12. If, at flow block 124, it is determined that a low power bit has been set "true" defining a reset as opposed to a "cold" start, the signal passes on line 142 to block 144 where the stack pointer of the already existing stack is obtained. Once the stack pointer is obtained from memory in block 144, the stack is recreated in block 146, and the instruction processor is restored in block 148 to a base count. Finally, the stack can be restored in block 150 and a return may be made at block 122.

Referring now to FIG. 3C, Such directs itself to the non-maskable interrupt routine which is a hardware control interrupt into the computer following the non-maskable interrupt (NMI) 152 actuation. The signal passes to flow block 154 where all registers are pushed onto the stack. The Low Battery flag is initialized to "true" in block 156 and the stack pointer is set in memory in block 158. Finally, passage to block 160 where the Set Sleep flag is set, following which a Halt command is provided in block 162.

With reference to FIG. 4, line 110 is the non-maskable interrupt line (NMI) into object server processor 44 which is derived from the low power monitor monitoring the battery voltage. When the battery voltage is less than a predetermined value such as 2.7 volts, the bit goes "true" which sets the NMI "true" to complete a low power interrupt shutdown.

FIG. 3D is the Server to Host Data Word routine which is seen as PCS3 in FIG. 4. The interrupt 3 which is software-generated in block 164' sends communications from the server 12 to the host and is software-generated using the interrupt table in the computer set-up block. A signal is written to block 178 where the word is written from the application to the peripheral chip select group 1 (PCS1) on line 908 of IC buffer 940 which is set to the output 16-bit bus for the overall interface.

The host mask is then written to peripheral chip select 3 (PCS3) in block 178' of FIG. 3D, and the PCS2 is enabled in block 180 awaiting an indication that a word has been written to the processor. A signal passes from block 180 to a Read decision block 182 where a determination is made as to whether or not the application-written word has been read. If a read has not occurred, a signal is passed on line 184 to re-enable PCS2 in block 180. Once the word has been read in block 182, the signal then passes to return 122 to indicate that the MCU has read the 16-bit word from the server.

Referring now to FIG. 4, there is shown the interrupt 2 (INT2) which is an interrupt issued by the register request card services module on the MCU coming in through line 914 of IC buffer 900. Line 914 is a PCMCIA standard register request line that determines whether the MCU wishes to know what type of card is being provided. Interrupt 2 is hardware intertupt shown at 186 of FIG. 3E. The hardware interrupt entering from block 186 passes to block 188 where all registers are pushed onto the stack. The signal then passes to block 190 which enables peripheral chip select group 0 (PCS0) to allow the MCU to directly address memory 960 through address buffer 950 in FIG. 4. The MCU selects the memory address corresponding to the requested tuple read through output buffer 940. The signal then floors to block 192 to determine if the MCU Read has been completed. If the MCU Read has not been completed, the signal returns to block 190 to re-enable PCS0. Once the MCU Read is complete, the signal passes to block 194 where PCS0 is disabled to disconnect the MCU address buffer 950. The signal then passes to block 196 which retrieves the stack and returns control through block 122.

Referring to FIG. 3F, the execution of interrupt 1 is shown. Such is directed to the process to look up a command word received from a MCU unit in order for server 12 to determine its function and if the process is invoked after an MCU has sent an instruction word to server 12, and it is necessary for server 12 to access the firmware to determine what portion of an application needs to be called in response to the given command word. The signal in the interrupt 1 is a hardware interrupt connected through IC buffer 900 of FIG. 4 for enabling on line 916 which is a standard interface control line used to initialize the output of I/O memory card in a PCMCIA environment. Control line 916 is used to send the command word from the MCU to server 12. Subsequent to generation of the interrupt 1 signal, all registers are pushed on the stack in flow block 210 of FIG. 3F.

Enablement is then made in block 212 to the peripheral chip select group 0 (PCS0) which is set to the 16-bit input bus 940 of FIG. 4. The host command word received in block 214 is then read into IC buffer 940 controlled by PCS1 on line 916.

The command word is then read from IC buffer 940 in flow block 214, and a search is made from look-up table 218 to determine the appropriate command word and routine to be called from server 12.

A serial search is made in block 216 with reference to look-up table 218 for a match between the host command word read in block 214 and each command word iteratively retrieved from the look-up table 218. Where the look-up table 218 has been stepped through but no match has been found, block 224 is initiated to send an error message indicating that condition. In block 224, an error routine is also called which sends an error back over the bus. Upon return of control from that error routine, the signal progresses to block 230 prior to return of control through 122. Where a match is found with a command word retrieved from look-up table 218, the signal proceeds from decision block 220 to flow blocks 222 and 226 where the function corresponding to the matched command word is called and the servers application is executed. After returning in block 228 from the called application function, all registers are popped in block 230, and control is returned through block 122.

FIG. 4 shows the breadboard circuitry associated with portable object server 12 mountable on a card member to be carried by the user. In that configuration, portable object server 12 becomes a modular server to be used in one or more of the processor's 16–20 of a network system, or as an autonomous network node. Additionally, as is clearly evident, portable object server 12 may then be used on a plurality of locationally displaced network systems 10, thus affording a user the enhanced capability to employ the portable server 12 at his or her location or any other location that is part of either the current or a displaced network system 10.

What is claimed is:

1. A portable network server system having object managing programs for connecting object structure data to database record structure and disk file formats for a network system having a plurality of processors comprising:

object server means operably and removably coupled to any one of said processors within said network system to establish thereat a network server having a plurality of network server functions, said network server functions including management and reversible transfer of object data between any two nodes defined by respective ones of said processors in said network system and formatting of data in accordance with a predetermined communication protocol, said object server means having an object server processor.

2. The portable network server system as recited in claim 1 including means for signal coupling one of said processors in said network system processor to at least one other of said processors for reversible transmission of said object data transmission therebetween.

3. The portable network server system as recited in claim 2 where said means for signal coupling includes a hard wired bus coupled between said processors of said network system.

4. The portable network server system as recited in claim 3 where said hard wired bus is selectively a (1) 16-bit I/O bus; or, (2) 32-bit I/O bus.

5. The portable network server system as recited in claim 3 where said hard wired bus is a PCMCIA interface line.

6. The portable network server system as recited in claim 2 where said object server means includes a processor interface means for electrically coupling said object server means to a first of said processors for reversible transmission thereto of processing signals.

7. The portable network server system as recited in claim 6 where said object server means includes said object server processor mounted thereon for processing said object data, said object server processor in signal communication with said processor interface means.

8. The portable network server system: as recited in claim 7 where said object server means includes object interface means within said object server means coupled to said object server processor and said processor interface means for providing data conversion signals to said processor interface means for reversible transmission of said processing signals to one of said processors of said network system.

9. The portable network server system as recited in claim 8 where said object interface means includes a plurality of first integrated circuit buffers coupled to said object server processor and said processor interface means for selective passage therethrough of signals responsive to processing of a predetermined program within said object server processor.

10. The portable network server system as recited in claim 9 where said object interface means includes a plurality of second integrated circuit buffers coupled to said object server processor and said first integrated circuit buffers for selectively controlling read/write signals processed in said object server processor.

11. The portable network server system as recited in claim 8 where said object server means includes object knowledge base means for storage and update of at least a portion of said object data, said object knowledge base means being coupled to said object server processor for reversibly transmitting object data signals therebetween.

12. The portable network server as recited in claim 11 where said object knowledge base means includes a plurality of static RAM elements in signal communication with said object server processor for passing object data signals therebetween.

13. The portable network server system as recited in claim 7 where said object server processor includes micromanager means therein being in signal communication with said object interface means and said object knowledge base means for reversibly retrieving said object data from said object knowledge base means and passing said object data to said first of said processors for processing a predetermined application program therein.

14. The portable network server system as recited in claim 1 where said object server means is releasably coupled to a global processor of said network system.

15. The portable network server system as recited in claim 1 where said object server means is a card member being reversibly insertable within at least one of said processors of said network system.

16. A portable server system having a plurality of processors and at least one of said processors remotely located from at least one other of said processors, comprising:

object server means operably and removably coupled to a first of said processors to establish thereat a network server having a plurality of network server functions, said network server functions including processing, management, and reversible transfer of object data between said first processor and at least one other of said processors, said network server functions further including formatting of data in accordance with a predetermined communication protocol, said object server means having an object server processor in interfacing relationship with said first processor for transfer of object data signals thereto.

17. The portable server system as recited in claim 16 where said object server means includes:

(a) object interface means in electrical communication to said object server processor and said first processor for providing data conversion signals to said first processor for reversible transmission of processed signals to at least one other of said processors;

(b) object knowledge base means for storage and update of said object data internal to said object server means, said object knowledge base means being in signal communication with said object server processor for reversible transmission of said object data signals therebetween; and, (c) object management means in signal communication with said object interface means and said object knowledge base means for reversibly retrieving said object data from said object knowledge base means and passing said object data to said first processor for processing a predetermined application program within said first processor.

18. A portable server system for a plurality of remotely disposed processors communication linked one relative to the others comprising:

(a) an object server operably and removably coupled to any selected one of said processors to establish thereat a network server having a plurality of network server functions, said network server functions including processing, management, and reversible transfer of object data between said processors, said network server functions further including formatting of data in accordance with a predetermined communication protocol;

(b) said object server including:
(1) an object server processor portion coupled in interfacing relationship with said selected processor for transfer of object data signals thereto;
(2) an object interface portion coupled to said object server processor portion for generating data conversion signals to said selected processor for reversible transmission of processed signals to at least one other of said processors;
(3) an object knowledge base portion coupled to said object server processor portion for storage and update of said object data internal to said object server; and,
(4) an object management portion coupled to said object interface and object knowledge base portions for reversibly retrieving said object data from said object knowledge base portion and passing said object data to said selected processor for processing a predetermined application program within said selected processor.

* * * * *